United States Patent Office 3,155,433
Patented Nov. 3, 1964

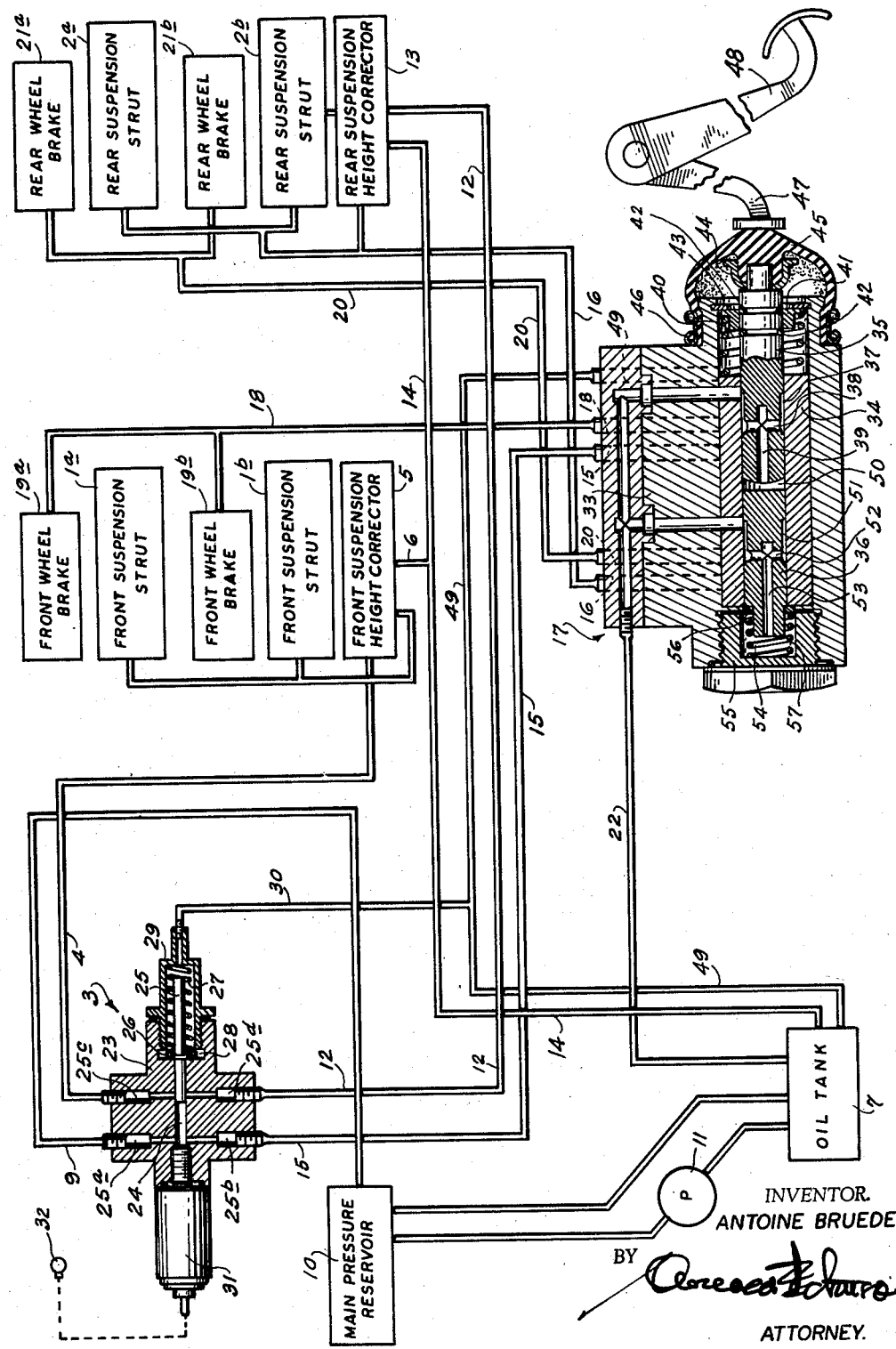

3,155,433
HYDRAULIC BRAKE SYSTEM INCLUDING A FLUID SUSPENSION BRAKE PRESSURE SUPPLY FOR VEHICLES
Antoine Brueder, Paris, France, assignor to Societe Anonyme Andre Citroen, Paris, France, a company of France
Filed Mar. 7, 1962, Ser. No. 178,172
Claims priority, application France, Mar. 11, 1961, 855,337
5 Claims. (Cl. 303—2)

The present invention relates to hydraulic brake systems for vehicles having oleopneumatic, hydropneumatic or other hydraulic suspension arrangements which incorporate hydraulic suspension accumulators or struts acting as suspension springs.

The present invention consists in a hydraulic brake system for a vehicle having an oleopneumatic, hydropneumatic or other hydraulic suspension system incorporating hydraulic suspension struts acting as suspension springs, wherein two different sets of brakes of the vehicle are arranged to be connected, respectively, to a source of hydraulic fluid under pressure and at least one of said suspension struts by control means actuated by a brake pedal.

The suspension struts may be supplied with hydraulic fluid from the pressure source and be connected thereto by a safety valve which is sensitive to the hydraulic pressure present upstream of the valve.

According to a preferred embodiment of the invention, the control means comprises a feed regulator consisting of two distribution slide valves, one of which controls the supply of hydraulic fluid to one set of brakes and the other the supply to the other set of brakes. One of these slide valves is submitted to, and biased against, the action of the brake pedal and the pressure present in one of the sets of brakes, while the other slide valve is submitted to, and biased against, the action of the pressure in both sets of brakes.

In order that the present invention may be more fully understood, reference will now be made, by way of example, to the accompanying drawing schematically illustrating a hydraulic brake system according to the invention, and wherein a safety valve and a feed regulator included in the system are shown in longitudinal section.

The hydraulic circuit illustrated in the drawing incorporates an oleopneumatic suspension system having front suspension struts 1a, 1b and rear suspension struts 2a, 2b. As is known, each of these struts comprises a chamber provided with a flexible membrane which encloses an upper space filled with gas under pressure. Each strut is interposed between the chassis of the vehicle and a wheel supporting arm.

The front suspension struts 1a, 1b are connected to a safety valve 3 by a conduit 4 in which is inserted a front suspension height corrector 5. The corrector 5 is constructed, in a manner known per se, to connect the valve 3 to the struts, to isolate the latter, or to connect both the valve and the struts to a conduit 6 leading to an oil tank 7 by way of a conduit 14, according to whether the height of the chassis relative to the ground is less than, equal to, or in excess of a given value.

The valve 3 is also connected to a main reservoir 10 by a conduit 9, and this main reservoir is connected, in turn, to a pump 11 driven by the vehicle motor. The pump intake is connected to the tank 7.

The rear suspension struts 2a, 2b are connected to the safety valve 3 by a conduit 12 in which is inserted a rear suspension height corrector 13. The corrector 13 is constructed in the same way as the corrector 5 and is connected, as is the latter, to the tank 7 by the return conduit 14.

The safety valve 3 and the struts 2a, 2b are connected by conduits 15 and 16, respectively, to a feed regulator 17. This feed regulator is connected to the front brakes 19a, 19b by a conduit 18, to the rear brakes 21a, 21b by a conduit 20 and to the tank 7 by a return conduit 22.

The safety valve 3 comprises a body 23 provided with a central bore 24 having four outlet ports 25a, 25b, 25c and 25d. The outlet ports 25a, 25b are located in the same transverse plane and are respectively connected to the conduits 9 and 15, while the ports 25c, 25d are located in the same transverse plane, which is spaced from the plane of the ports 25a, 25b, and are respectively connected to the conduits 4 and 12. A piston or valve member 25 is slidably mounted in the central bore 24 and is provided with a disc or shoulder 26 which is acted on by a spring 27 located in a chamber 28 of the body 23. The end of the spring 27 remote from the shoulder presses against the end of a sealing cap 29 screwed into the body 23. The sealing cap 29 is connected to the tank 7 by a conduit 30 which enables leakages to be returned to the tank by way of a return conduit 49. The safety valve is provided with a pressure sensitive switch 31 which, when the pressure within the valve is less than a given value, causes a signal lamp 32 on the dashboard of the vehicle to light up.

The valve 3 always connects the main reservoir 10 to the feed regulator 17. In the position shown on the drawing, the piston 25 blocks the outlet ports 25c and 25d to the suspension struts. When the pressure within the valve reaches a sufficiently high value, the piston 25 is pushed back against the action of the spring 27 and the main reservoir 10 is connected to the suspension struts.

The feed regulator 17 comprises a body 33 into which a sleeve 34 is tightly fitted. Two valve members 35 and 36 are slidably mounted in the sleeve 34. The valve member 35 is provided with an annular groove 37 intermediate its ends, this groove communicating with an axial bore 39 at the inner end of the valve member through radial bores 38. The sliding valve member 35 is normally held in the position shown on the drawing by a spring 40, and in this position the groove 37 connects together the bores provided in the body and the sleeve which are connected to the conduits 18 and 22. The front brakes are thus connected to the tank 7 and are consequently in the non-braking position. The spring 40 rests both on the sleeve 34 and on a disc 41 which is secured to the valve member 35 by means of rings 42. Movement of the disc 41 under the action of the spring 40 is limited by a circlip 43 fixed in the body 33. The outer end of the valve member 35 is formed with a shoulder on which rests a cup 44. The inner boss of a rubber cap 45 engages in the cup 44 and the cap covers the end of the body 33 of the feed regulator and is clamped to the body by means of a ring 46. A control member 47 abuts the cap 45, and may be moved by the brake pedal 48. Moreover, the cap 45 assures a hermetic seal by collecting any possible oil leakage which is returned to the tank 7 by a conduit 49.

When pressure is applied to the pedal 48, the valve member 35 is moved to the left, as viewed on the drawing, so that the groove 37 connects together the bores provided in the body and the sleeve which are connected to the conduits 15 and 18. The main reservoir 10 is thus connected to the front brakes and, by means of the bores 38 and 39, to the space 50 between the two valve members 35 and 36.

The valve member 36 is provided, intermediate its ends, with an annular groove 51 which communicates with an axial bore 53 at the outer end of the valve member through radial bores 52. The valve member 36 is normally held in the position shown on the drawing by means of a spring 54, and in this position the groove 51 connects conduits 20 and 22, that is the tank 7 is connected to the rear brakes which are consequently in a non-braking position. The spring 54 is located between the end of a stopper 55 screwed into the body 33 and a supporting disc 56 abutting a shoulder on the valve member 36.

When the space 50 is connected to the main reservoir 10, the pressure in this space tends to move the piston 36 to the left, as viewed on the drawing, so that the groove 51 connects the conduits 16 and 20. The rear suspension struts are thus connected with the rear brakes as well as with the inner space 57 of the stopper 55.

From the above, it will be seen that there are two completely separate hydraulic braking circuits; the front brakes 19a, 19b are supplied from the main reservoir 10 whereas the rear brakes 21a, 21b are supplied from the rear suspension struts 2a, 2b.

The braking system described above, operates as follows:

When the vehicle motor is started, the pump 11 sucks in liquid from the tank 7 and feeds it under pressure to the reservoir 10 and then to the safety valve 3. The pressure in the various conduits, as well as in the valve 3, increases. The effect of this pressure is to move the valve member 25 in the valve 3 against the action of the spring 27 which is compressed to a given pressure P. When this pressure P is reached, the different front and rear suspension struts 1a, 1b and 2a, 2b are connected to the main reservoir 10; at the same time, the pressure sensitive switch 31 breaks the circuit of the dashboard lamp 32. When this lamp goes out the driver knows that the pressure in all the hydraulic braking and suspension circuits is correct.

When the driver, wishing to brake, presses on the pedal 48, the valve member 35 is moved in sleeve 34 against the action of the spring 40. The initial result of this movement is to break the connection between the front brakes 19a, 19b and the return conduit to the tank 7, and then to connect these brakes to the main reservoir 10 by means of conduit 15; this pressure is, moreover, admitted to the space 50 by the bores 38 and 39. The effect of the increase of pressure in the space 50 is to move the valve member 36 against the action of the spring 54. This movement breaks the connection between the rear brakes 21a, 21b and the return conduit to the tank 7, and connects these brakes to the rear suspension struts 2a and 2b. The space 57 is also connected to these suspension struts.

The pressure applied in the space 57 to the outer end of the valve member 36 and that applied in the space 50 to the inner end of the valve member 35 tends to return these valve members to their initial positions. A balance is thus created between the force applied on the brake pedal 48 in one direction and the force applied by said pressures in the opposite direction; this balance makes it possible to regulate the braking.

It will be noted that the braking time of the front brakes predominates. In fact, the valve member 35 moves before the valve member 36. Moreover, the valve member 36 is in equilibrium between the force applied to its inner face by the pressure existing in the front brakes and the forces applied to its outer face, on the one hand, by the spring 54 and, on the other hand, by the pressure existing in the rear brakes. Consequently, the pressure in the rear brakes is necessarily below that present in the front brakes.

When the lamp 32 lights up, the driver is warned that something has happened in the suspension or braking system and that an accident may occur. The fact that there are totally separated front and rear brake circuits and separated energy accumulators provides a guarantee of being able to stop the vehicle once the warning signal has been given by the lamp lighting up.

It will be noted that the safety valve gives absolute priority, over all the other hydraulic systems that may be incorporated in the vehicle (suspension, power steering etc.), to supplying the front brakes until the pressure upstream of the valve is sufficient to move the valve member 25 and cause connection of the conduits 25a, 25b with 25c, 25d.

It is to be understood that the invention is not limited to the embodiment hereinbefore described, modifications of which can be made without departing from the scope of the invention as defined by the appended claims.

I claim:

1. A hydraulic brake system for a vehicle having a suspension system incorporating hydraulic suspension struts acting as suspension springs, comprising two different sets of brakes, a brake pedal, control means operable by said brake pedal and connected to said sets of brakes, a source of hydraulic fluid under pressure, means connecting said control means to said pressure source and at least one of said suspension struts, said control means being operative to connect one of said sets of brakes to said pressure source and the other set of brakes to said at least one suspension strut, and means connecting said suspension struts to said pressure source and having a safety valve interposed therein which is sensitive to the pressure in said means connecting said control means to said pressure source for isolating said suspension struts from each other and from said pressure source whenever the sensed pressure is less than a predetermined value.

2. A hydraulic brake system for a vehicle having a suspension arrangement incorporating hydraulic suspension struts acting as suspensions springs, comprising two different sets of brakes, a brake pedal, a feed regulator comprising two distribution slide valves, a source of hydraulic fluid under pressure, means connecting one of said valves to one of said sets of brakes and said pressure source, means connecting the other of said valves to the other set of brakes and at least one of said suspension struts, means for normally biassing said valves to positions where they disconnect said sets of brakes from said pressure source and from said at least one suspension strut, respectively, said one valve being operable by said brake pedal to connect said pressure source to said one set of brakes, means for effecting actuation of said other valve by said pressure source in response to operation of said one valve in order to connect said other set of brakes to said at least one suspension strut, and means connecting said suspension struts to said pressure source and having a safety valve interposed therein which is sensitive to the pressure in said means connecting said one valve to said pressure source for isolating said suspension struts from each other and from said pressure source whenever the sensed pressure is less than a predetermined value.

3. A hydraulic brake system for a vehicle having a suspension arrangement incorporating hydraulic suspension struts acting as suspension springs, comprising two different sets of brakes, a brake pedal, a feed regulator including two distribution slide valves, a source of hydraulic fluid under pressure, a tank for containing hydraulic fluid, means connecting one of said valves to one of said sets of brakes, said pressure source and said fluid tank, means connecting the other of said valves to the other set of brakes, said fluid tank and at least one of said suspension struts, means for normally biassing said valves to positions where they connect said sets of brakes with said tank and disconnect said sets of brakes from the pressure source and said at least one suspension strut, respectively, said one valve being operable by said brake pedal to connect said pressure source to said one set of brakes, means for effecting actuation of said other valve by fluid from said pressure source in response to operation of said one valve in order to connect said other set of brakes to said at least one suspension strut, and means connecting said suspension struts to said pressure source and having a safety valve interposed therein which is sensitive to the pressure in said means connecting said one valve to said pressure source for isolating said suspension struts from each other and from said pressure source whenever the sensed pressure is less than a predetermined value.

4. A system as claimed in claim 3, wherein said two distribution slide valves have a common housing and are constituted by two valve members slidably mounted in a single bore in said housing, the valve member constituting part of said one valve being adapted to be moved by the brake pedal and having a bore therethrough constituting said means for effecting actuation of said other valve by applying fluid from said pressure source to the adjacent face of the valve member constituting part of said other valve when said one valve is operated.

5. In a vehicle having front and rear pairs of wheels and a suspension arrangement incorporating front and rear hydraulic suspension struts respectively acting as suspension springs for each wheel of the vehicle, a hydraulic brake system comprising front and rear sets of brakes associated with said front and rear pairs of wheels respectively, a brake pedal, a feed regulator including two distribution slide valves, a source of hydraulic fluid under pressure, a tank for containing hydraulic fluid, means connecting one of said valves to the front set of brakes, said pressure source and said fluid tank, means connecting the other of said valves to the rear set of brakes, said fluid tank and the rear suspension struts, means for normally biassing said valves to positions where they connect said sets of brakes with said tank and disconnect said sets of brakes from the pressure source and the rear suspension struts respectively, said one valve being operable by said brake pedal to connect said pressure source to said front set of brakes means for effecting actuation of said other valve by said pressure source in response to operation of said one valve in order to connect said rear set of brakes to said rear suspension struts, and means connecting said suspension struts to said pressure source and having a safety valve interposed therein which is sensitive to the pressure in said means connecting said one valve to said pressure source for isolating said front and rear suspension struts from each other and from said pressure source whenever the sensed pressure is less than a predetermined value.

References Cited in the file of this patent
UNITED STATES PATENTS

| | | |
|---|---|---|
| 2,942,917 | Swander | June 28, 1960 |
| 3,002,791 | Pease | Oct. 3, 1961 |